(12) United States Patent
Matsunobu et al.

(10) Patent No.: US 6,239,525 B1
(45) Date of Patent: *May 29, 2001

(54) PERMANENT MAGNET DYNAMOELECTRIC ROTATING MACHINE AND ELECTRIC VEHICLE EQUIPPED WITH THE SAME

(75) Inventors: Yutaka Matsunobu, Hitachi; Fumio Tajima, Jyuou-machi; Takashi Kobayashi, Hitachiohta; Shouichi Kawamata, Hitachi; Suetaro Shibukawa, Hitachinaka; Osamu Koizumi, Ibaraki-machi; Keiji Oda, Hitachinaka, all of (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/498,030

(22) Filed: Feb. 4, 2000

Related U.S. Application Data (63) Continuation of application No. 08/929,581, filed on Sep. 15, 1997.

(30) Foreign Application Priority Data

Sep. 13, 1996 (JP) .................................................... 8-243218

(51) Int. Cl.$^7$ ............................. H02K 21/12; H02K 21/14
(52) U.S. Cl. ............................................ 310/156; 310/261
(58) Field of Search .................................... 310/156, 181, 310/261; 29/596–598

(56) References Cited

U.S. PATENT DOCUMENTS

| | | | |
|---|---|---|---|
| 3,840,763 * | 10/1974 | Baumann et al. .................. | 310/156 |
| 4,322,648 * | 3/1982 | Ray et al. ............................. | 310/156 |
| 4,403,161 * | 9/1983 | Miyashita et al. .................. | 310/156 |
| 4,651,066 * | 3/1987 | Gritter et al. ........................ | 318/139 |
| 5,157,298 * | 10/1992 | Kawabata ............................. | 310/156 |
| 5,159,220 * | 10/1992 | Kliman ................................. | 310/156 |
| 5,220,228 * | 6/1993 | Sibata ................................... | 310/254 |
| 5,233,250 * | 8/1993 | De Filippis ......................... | 310/156 |
| 5,475,277 * | 12/1995 | Johnson ............................... | 310/156 |
| 5,510,662 * | 4/1996 | Tanimoto et al. ................... | 310/156 |
| 5,631,512 * | 5/1997 | Kawabata et al. .................. | 310/156 |
| 5,670,836 * | 9/1997 | Horst .................................... | 310/156 |
| 5,672,926 * | 9/1997 | Brandes et al. ..................... | 310/181 |
| 5,731,647 * | 3/1998 | Schuller et al. ..................... | 310/114 |
| 5,783,890 * | 7/1998 | Mulgrave ............................. | 310/156 |
| 5,811,904 * | 9/1998 | Tajima et al. ........................ | 310/156 |
| 5,844,344 * | 12/1998 | Uetake et al. ....................... | 310/156 |
| 5,936,322 * | 8/1999 | Yamaguchi et al. ................ | 310/156 |
| 6,034,459 * | 3/2000 | Matsunobu et al. ................ | 310/156 |

FOREIGN PATENT DOCUMENTS 5-76146    3/1993   (JP) .

* cited by examiner

*Primary Examiner*—Tran Nguyen
(74) *Attorney, Agent, or Firm*—Evenson, McKeown, Edwards & Lenahan, P.L.L.C.

(57) ABSTRACT

A permanent magnet dynamoelectric rotating machine comprises a stator provided with windings; and a rotor disposed with an air gap between the stator and the rotor, and provided with a plurality of permanent magnets arranged along the circumference of the rotor and fixed to the rotor. The circumferential length of a surface of each permanent magnet facing the stator is determined so that an induced voltage has a waveform approximate to a sinusoidal waveform to suppress the peak of the induced voltage.

2 Claims, 14 Drawing Sheets

PERMANENT MAGNET DYNAMOELECTRIC ROTATING MACHINE AND ELECTRIC VEHICLE EQUIPPED WITH THE SAME

This application is a continuation of application Ser. No. 08/929,581, filed Sept. 15, 1997.

This application claims the priority of Japan Application No. 8-243218, filed Sep. 13, 1996, the disclosure of which is expressly incorporated by reference herein.

BACKGROUND OF THE INVENTION

The present invention relates to a permanent magnet dynamoelectric rotating machine and to an electric vehicle equipped with the same. More particularly, the present invention relates to such a dynamoelectric rotating machine which has a plurality of permanent magnets fixedly arranged along the circumference of a rotor. As used herein, the term "dynamoelectric rotating machine" includes an electromechanical device for converting electrical energy into mechanical energy, and vice versa. Hereinafter, for simplicity such devices will be referred to as "electric machines".

Permanent magnet electric machine of this generic type are known. For example, JP-A No. 5-76146 discloses a high-torque, high-efficiency permanent magnet electric machine which has a rotor with embedded permanent magnets. An annular stator core is provided with a plurality of slots, with stator windings for three phases embedded therein. A substantially cylindrical rotor core is mounted on a shaft, and has a plurality of axial slots in its inner circumference, with permanent magnets—having a rectangular section—embedded therein and oriented so that adjacent permanent magnets generate magnetic fluxes of opposite polarities toward the outer circumference of the rotor. The rotor is supported for rotation in the annular stator, with a predetermined air gap between the inner circumference of the stator core and the outer circumference of the rotor.

Such an electric machine, which uses permanent magnets with a rectangular section, is able to operate efficiently because the field when weakens it is operating at a high rotating speed. Therefore, the permanent magnet electric machine can effectively be applied to uses which require operation at a high rotating speed, such as a drive motor for an electric vehicle.

This conventional permanent magnet electric machine, however, has the following problems in the waveform of an induced voltage.

When the rotor is driven by an external force, an induced voltage is generated in the electric machine, causing a current to flow through a power circuit or a control circuit. The effective (that is, rms) induced voltage which will be generated at a particular rotating speed can be determined beforehand, and the control circuit can be designed to withstand the effective induced voltage (or to suppress the effective induced voltage to protect the control circuit).

However, an actual induced voltage has a waveform produced by superposing several waveforms on a sinusoidal waveform. Since the effective (rms) value is the average value of the varying voltage represented by the waveform, the waveform representing the actual induced voltage necessarily has a peak which is more than $\sqrt{2}$ times the effective value. Therefore, the peak value must be nearly equal to $\sqrt{2}$ times the effective value to protect the control circuit designed so as to reliably withstand a voltage equal to $\sqrt{2}$ times the effective value.

The reduction of the magnetic flux density of magnetic fields created by the permanent magnets is a possible means for reducing the peak value. However, the reduction of the magnetic flux density necessarily entails a reduction of the driving torque of the permanent magnet electric machine.

In order to provide a solution to the foregoing problems, it is an object of the present invention to suppress the peak value of an induced voltage relative to an effective value of the induced voltage, without reducing the driving torque of a permanent magnet electric machine.

Another object of the present invention is to provide an electric vehicle having enhanced safety, capable of suppressing the peak value of an induced voltage generated by a permanent magnet electric machine when the electric vehicle is braked or when the same travels a downhill slope.

SUMMARY OF THE INVENTION

The foregoing object is achieved by the permanent magnet electric machine according to the invention, which comprises a stator provided with stator windings, and a rotor disposed inside the stator with an air gap between the stator and the rotor. The rotor core has a plurality of permanent magnets embedded along the circumference thereof, so that a voltage is induced in the permanent magnet electric machine which has a waveform that is approximately sinusoidal. In a preferred embodiment of the invention, this effect is achieved by regulating the circumferential width of surfaces of the permanent magnets facing the stator.

Another object of the present invention can be achieved by an electric vehicle provided with the foregoing permanent magnet electric machine in accordance with the present invention, in which the induced voltage generated while the electric vehicle is being braked or while the electric vehicle is traveling a downhill slope has a substantially sinusoidal waveform.

Other objects, advantages and novel features of the present invention will become apparent from the following detailed description of the invention when considered in conjunction with the accompanying drawings.

DETAILED DESCRIPTION OF THE PREFERRED EMBODIMENTS

Preferred embodiments of the permanent magnet electric machine according to the present invention will be described hereinafter with reference to the accompanying drawings.

Figure 1:
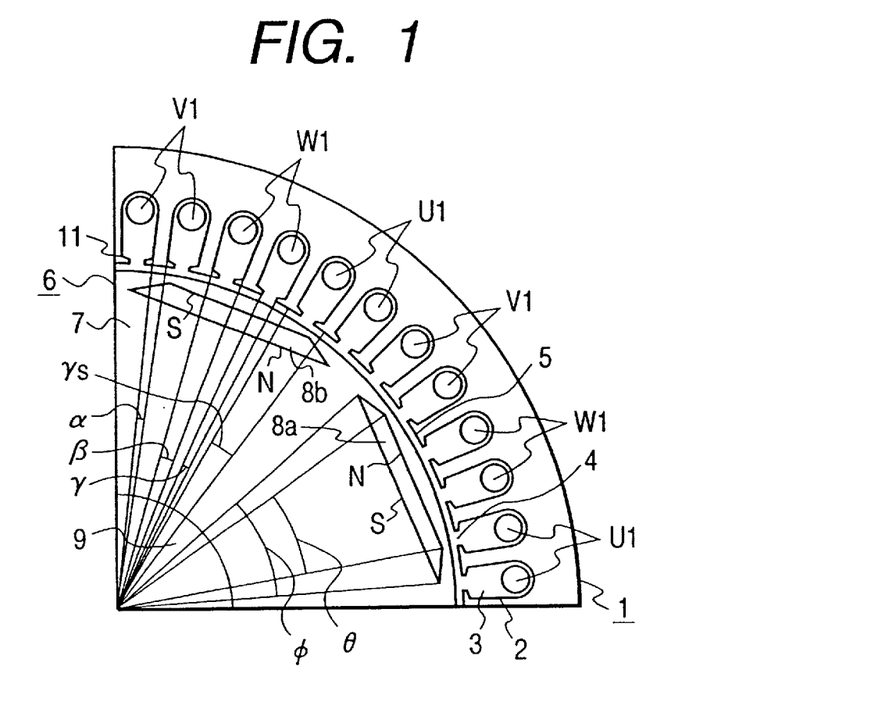
FIG. 1 is a fragmentary cross-sectional view of a permanent magnet electric machine according to a first embodiment of the present invention.
Figure 2:
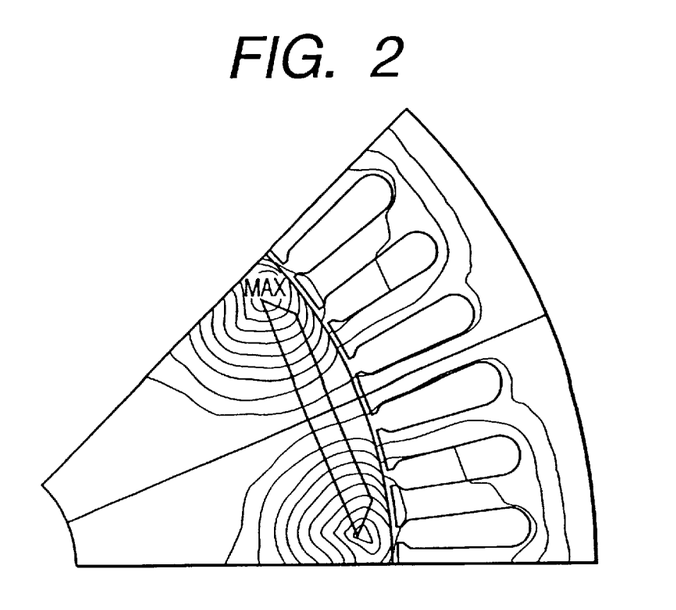
FIG. 2 is a diagram showing the magnetic flux density distribution in the permanent magnet electric machine of FIG. 1.

FIG. 1 is a fragmentary cross-sectional view of a 3-phase, 8-pole, 48-slot inner rotor type permanent magnet electric machine according to a first embodiment of the present invention, showing one of pole pairs; while FIG. 2 is a diagram of magnetic flux density distribution in the permanent magnet electric machine of FIG. 1.

The permanent magnet electric machine has a stator 1 and a rotor 6. The rotor 6 is inserted in the stator 1 and is supported for rotation with an air gap 5 between the outer circumference thereof and the inner circumference of the stator 1.

The stator 1 has a substantially annular stator core 2 provided with forty-eight slots 3, and U-phase stator windings U1, V-phase stator windings V1 and W-phase stator windings W1 fitted in the forty-eight slots 3. The slots 3 have openings 4 in the inner circumference of the stator core 2.

The rotor 6 has a rotor core 7 mounted on a shaft 9, with eight axially extending permanent neodymium magnets 8 (only two permanent magnets 8a and 8b are shown in FIG. 1) embedded around the circumference of the rotor core 7. The permanent magnets 8 are arranged alternately with opposite polarities, as shown in FIG. 1. The rotor core 7 has a plurality of laminated silicon steel core plates. Each permanent magnet 8 has a trapezoidal cross section in which an angle θ, whose sides are radii of the rotor and pass through the opposite ends of the outer side of the trapezoidal cross section (nearer to the stator 1), is smaller than an angle φ, whose sides are radii of the rotor and pass through the opposite ends of the inner side of the trapezoidal cross section (farther from the stator 1).

The angles θ and φ can be defined similarly to the foregoing definition even if each permanent magnet 8 has a cross section which is other than the trapezoidal. For example, if the permanent magnet 8 has a cross section which is a fragment of an annular shape, the angle θ is an angle whose sides are radii of the rotor and pass through the opposite ends of the outer circular arc of the annular fragment (nearer to the stator 1), and the angle φ is an angle whose sides are radii of the rotor and pass through the opposite ends of the inner circular arc of the annular fragment (farther from the stator 1).

The waveform of an induced voltage which is generated when the rotor 6 is rotated by an external force varies with the angle θ. On the other hand, the driving torque of the permanent magnet electric machine varies with the angle φ, because the maximum width (that is, the circumferential extent) of the permanent magnet 8 is determined by the angle φ. Since the rotor 6 is provided with the eight permanent magnets 8, the angle θ is necessarily between 0° and 45°. If the angle θ is close to 45°, it is difficult to secure a reluctance torque, because the circumferential extent of auxiliary salient poles is very small. If the angle θ is close to 0°, the waveform of the induced voltage is dependent on the angle φ, however, there is no angle φ which is capable of simultaneously achieving an ideal waveform and maximum driving torque.

Figure 3:
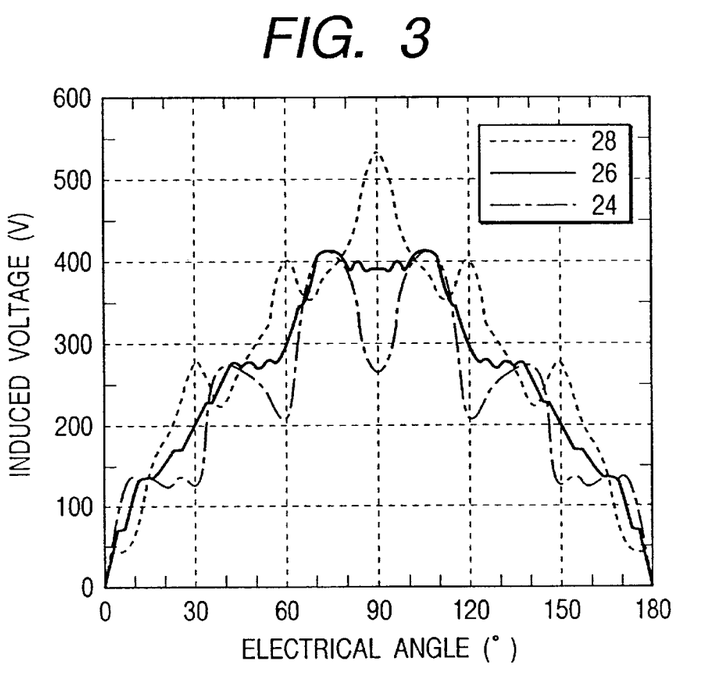
FIG. 3 is a diagram showing waveforms of voltages for θ=24°, 26° and 28° (FIG. 1) induced while the permanent magnet electric machine of FIG. 1 is operating at a maximum rotating speed.
Figure 4:
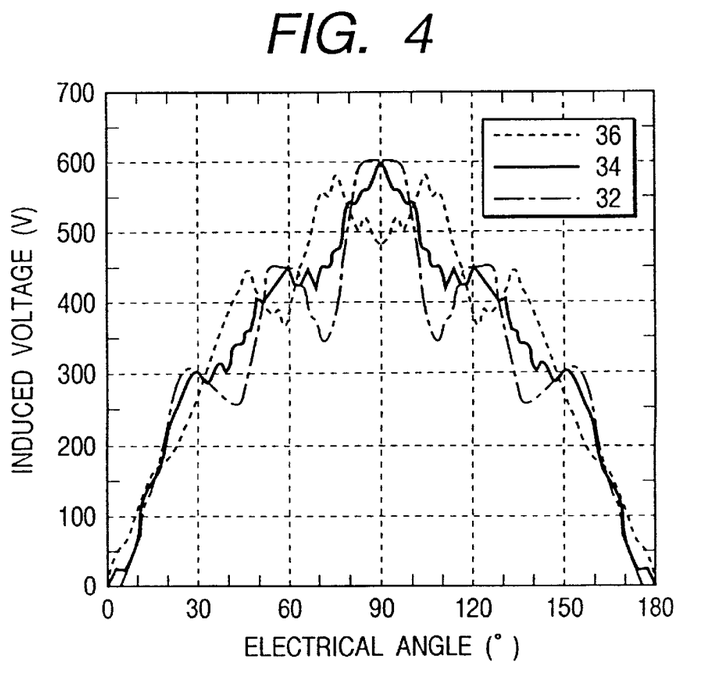
FIG. 4 is a diagram showing waveforms of voltages for angle θ=32°, 34° and 36° (FIG. 1) induced while the permanent magnet electric machine of FIG. 1 is operating at a maximum rotating speed.

FIGS. 3 and 4 show the waveforms of voltages induced when the rotor 6 rotates at a maximum rotating speed, for the angle θ=24°, 26° and 28°, and angle θ=32°, 34° and 36°. As shown in FIGS. 3 and 4, the induced voltages exhibit, respectively: a convex waveform (that is, a waveform having a convex peak) formed by superposing five crests on a sinusoidal waveform; a substantially sinusoidal waveform which has no sharp irregularities; and a concave waveform (a waveform with a concave peak formed by superposing five troughs on a sinusoidal waveform. These waveforms conform to the following rule; The induced voltage has a concave waveform when $18.75° < \theta < 26.25°$ and $33.75° < \theta < 41.25°$; a convex waveform when $26.25° < \theta < 33.75°$; and a waveform which has no sharp irregularities (similar to a sinusoidal waveform) when $\theta = 26.25°$ or $33.75°$. More specifically, the induced voltage has a convex waveform when $\{(2n-1)+0.5\} \times \tau_s < \theta < (2n+0.5) \times \tau_s$, and has a waveform with no sharp irregularities when $\theta = (n+0.5) \times \tau_s$. ($\tau_s$ is the pitch of the slots of the stator and n is a natural number.) The induced voltage has a concave waveform when $(2n+0.5) \times \tau_s < \theta < \{(2n+1)+0.5\} \times \tau_s$.

The maximum value of the convex waveform is the value of the peak at an electrical angle of 90°. The concave waveform has two maximum values (two peaks) on opposite sides of a trough at an electrical angle of 90°. Therefore, the least pronounced peak is on a smooth waveform, i.e., a waveform similar to a sinusoidal waveform. In this embodiment, the waveform of the induced voltage is very similar to a sinusoidal wave when the angle θ is about 26° or 34°.

A waveform distortion factor is used to evaluate quantitatively the degree to which the waveform of an actual induced voltage approximates a sinusoidal waveform.

Such a waveform distortion factor may be defined by formula:

(Waveform distortion factor)=(Voltage at electrical angle 90°)/
(Effective value of voltage)×√2

This formula is based on a fact that for a pure sine wave, the voltage at an electrical angle of 90° is equal to √2×(effective value). The waveform distortion factor of a convex waveform is thus greater than 1 (one), the waveform distortion factor of a concave waveform is less than 1 (one). A waveform distortion factor which is close to 1 (one) indicates a close approximation to a pure sinusoidal waveform.

Figure 5:
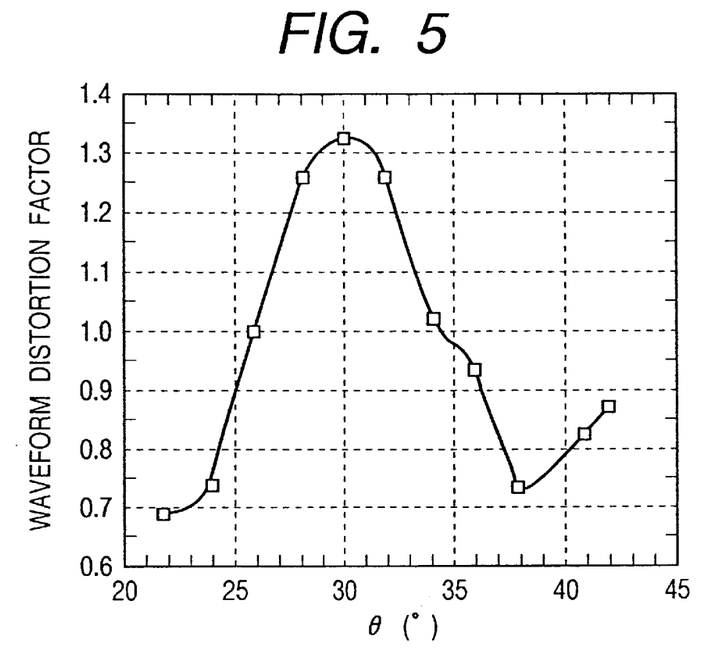
FIG. 5 is a graph showing the relationship between the angle θ (FIG. 1) and a waveform distortion factor.

FIG. 5 is a graph showing the variation of waveform distortion factor with the angle θ. It shows that the waveform of an induced voltage approximates a sinusoidal waveform (distortion factor equal to one) when the angle θ is about 26° or about 34°. In this regard, it should be noted that in FIGS. 3, 4 and 5, the angles 26° and 34° are within a range of 26.25±1° and a range 33.75±1°, and that 26.25° and 33.75° are (n+0.5) times the pitch $\tau_s = 7.5°$ of the slots, where n is a natural number. That is, the waveform of an induced voltage is approximate to a sinusoidal waveform when the angle θ is approximately equal to $(n+0.5) \times \tau_s$, where n is a natural number.

Figure 6:
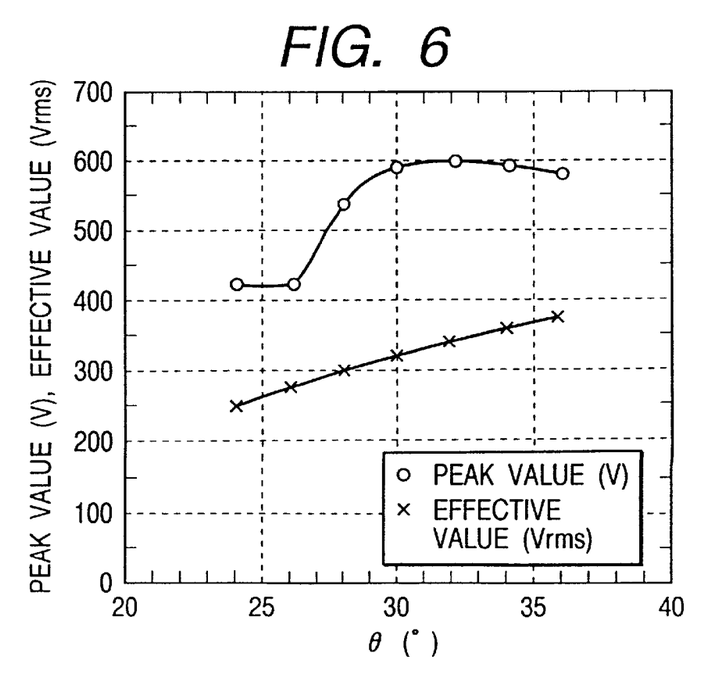
FIG. 6 is a graph showing the relationship between the angle θ (FIG. 1) and the peak value and the effective value of an induced voltage.

FIG. 6 shows the variation of the peak value and the effective value of an induced voltage as a function of the angle θ. The effective value increases as the angle θ increases, because a greater angle θ corresponds to a larger permanent magnet, and a larger magnet creates a magnetic field of a greater main magnetic flux. The peak value, on the other hand, varies in steps with the angle θ. That is, it decreases gradually as the angle θ increases in a range of the angle θ below 26°, increases sharply as the angle θ increases beyond 26°, and decreases gradually as the angle θ increases beyond 32°.

Generally, the greater the effective value, the greater is the main flux and hence the higher is the driving torque. Since a control circuit or the like is designed taking into consideration the effective value specific to the permanent magnet electric machine, it is desirable that the peak value is as close as possible to √2 times the effective value. Therefore, it is most desirable that the angle θ is about 26°, because at that angle the effective value is large and the peak value is approximately equal to √2 times the effective value (FIG. 6).

The angle θ is fixed at 26°, and the magnetic flux is corrected by varying the angle φ to a value which maximizes the sum of the torque produced by the main magnetic flux and the reluctance torque. The driving torque T of the permanent magnet electric machine is expressed by:

$$T = \psi Iq + (Lq - Ld) Iq \times Id$$

where ψ is the magnetic flux produced by the permanent magnet, Lq is q-axis inductance, Ld is d-axis inductance, Iq is q-axis coil current and Id is d-axis coil current. In this expression, the first term on the right side represents the torque produced by the main magnetic flux of the permanent magnet, while the second term represents a reluctance torque produced by the portion of the rotor which lies between the adjacent permanent magnets (i.e., an auxiliary salient pole). Since these torques are dependent on the angular extent of the permanent magnet, and the angular extent of the auxiliary salient pole, the angular extent of the permanent magnet on the rotor which maximizes the driving torque, is determined univocally.

Figure 7:
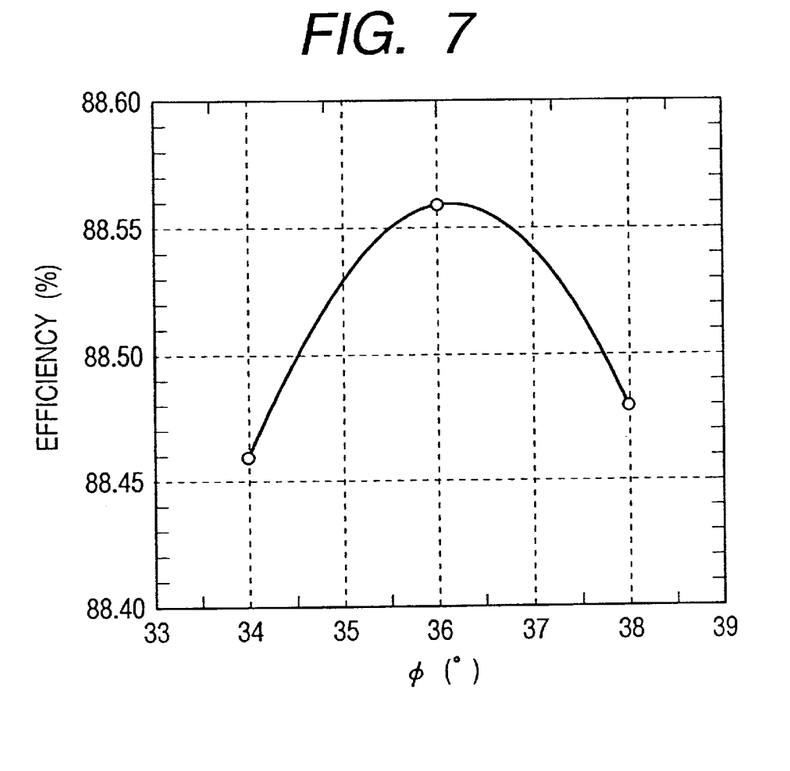
FIG. 7 is a diagrammatic view showing the relationship between the angle θ (FIG. 1) and a weighted average efficiency, including inverter loss and taking into consideration the frequency of use of the motor.

FIG. 7 shows the relation between the angle φ and weighted average efficiency, including inverter loss and taking the frequency of use of the motor into consideration. It can be seen that the weighted mean efficiency is a maximum when the angle φ is equal to 36°.

Thus, if the permanent magnets of the electric machine are such that the angle θ equals 26° and the angle φ equals 36°, it follows that the waveform of the induced voltage will approximate a sinusoidal waveform, the peak value of the induced voltage is suppressed and the driving torque of the permanent magnet electric machine can be increased to a maximum.

Figure 8:
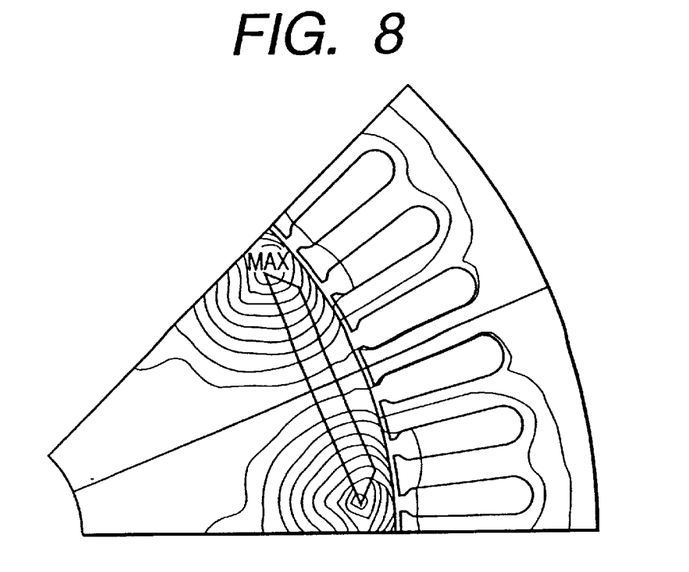
FIG. 8 is a diagram showing the magnetic flux density distribution when the angles θ and φ of FIG. 1 are applied to another embodiment, with a radius, thickness and output capacity differing from those of the foregoing embodiment.
Figure 9:
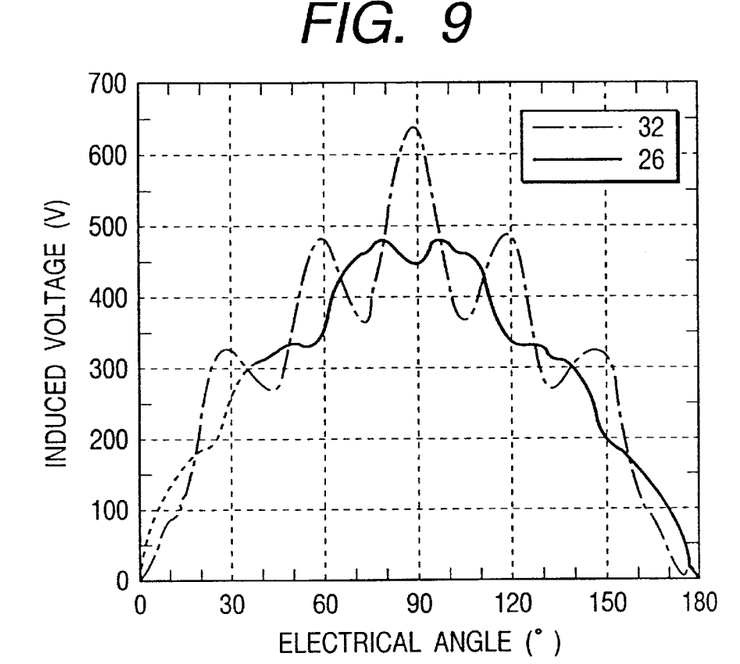
FIG. 9 is a waveform diagram of the voltage induced in the embodiment shown in FIG. 8.
Figure 10:
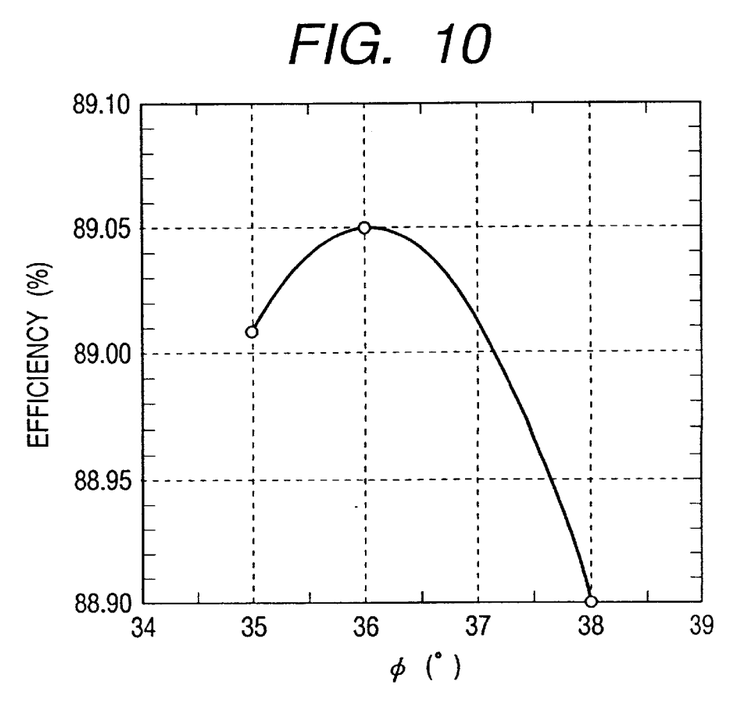
FIG. 10 is a diagram showing the relationship between the angle φ and weighted mean efficiency, including inverter loss, in the embodiment shown in FIG. 8.

FIG. 8 shows a magnetic flux density distribution on another permanent magnet electric machine having a radius, a thickness and an output capacity different from those of the preceding example, measured to confirm the flexibility of the shape of the permanent magnets expressed by the angles θ and φ. FIG. 9 shows the waveform of the voltage induced in the permanent magnet electric machine, and FIG. 10 shows the relation between the angle φ and weighted mean efficiency, including an inverter loss. In this permanent magnet electric machine, the waveform of the induced voltage approximates a sinusoidal waveform when the angle θ is 26° (FIG. 9), and the driving torque is a maximum when the angle φ is 36° (FIG. 10). It is desirable that the angle θ be equal to (n+0.5) (n is a natural number) times the slot pitch $\tau_s$ when an angle α formed by a tooth of a general stator and an angle β formed by a slot of the stator are approximately equal to each other. (See FIG. 1.) However, the waveform of the induced voltage approximates a sinusoidal waveform when $$\theta \approx n \times \tau_s + \alpha$$

or particularly when $$\theta \approx n \times \tau_s + \beta$$

if the angles α and β differ substantially. The waveform of the induced voltage is approximated when $$\theta \approx n \times \tau_s + \gamma$$

if the difference between the angle β formed by the slot of the stator and the angle γ formed by the opening of the stator is very large, i.e., if the teeth project greatly. If, however, the radial length of the projection is small, the magnetic flux of a projection saturates and the angle γ affects the angle θ very little. Then, $$\theta \approx n \times \tau_s + \gamma \times A$$

where A (0<A≦1) is a coefficient indicating the degree of influence of the angle γ on the angle θ.

Figure 11:
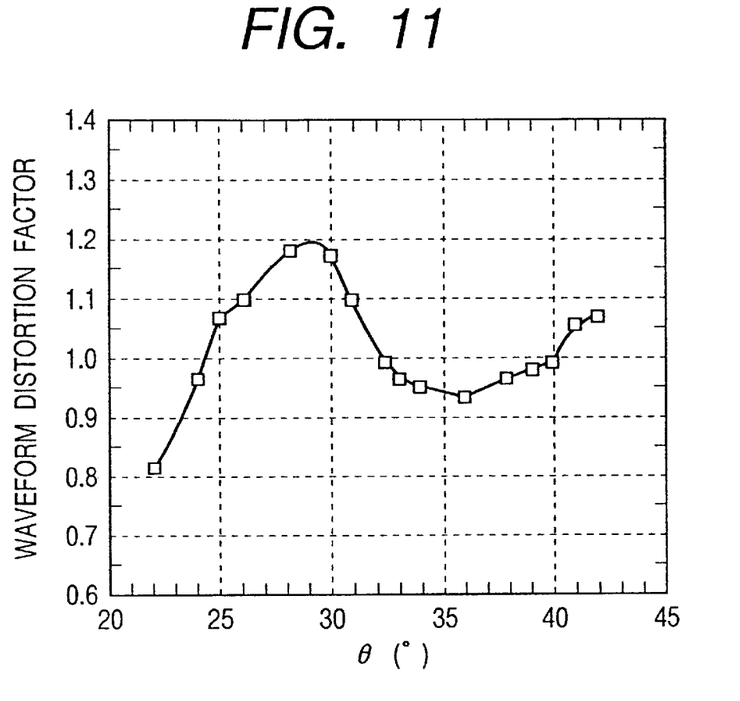
FIG. 11 is a diagram showing the relationship between the angle θ and a waveform distortion factor in a permanent magnet electric machine according to a second embodiment of the present invention employing ferrite magnets.

The permanent magnets 8 need not be limited to neodymium magnets. For example, FIG. 11 shows test results of the waveform distortion factor shown in FIG. 5 carried out using a ferrite magnet. In FIG. 11, the angle θ is smaller than that shown in FIG. 5 by a machine angle of 2°, which is considered to be due to a fact that the projection of the slot of the stator cannot fully be saturated because the magnetic force of the ferrite magnet is lower than that of the neodymium magnet. Therefore, the angle θ which causes the waveform of the induced voltage to approximate a sinusoidal waveform when a ferrite magnet is used is expressed by:

$$\theta \approx n \times \tau_s + \gamma \text{ (n is a natural number)}$$

In the present invention, the angle γ for which the waveform of the induced voltage approximates a sinusoidal waveform is not dependent on the shape of the magnet.

Figure 12:
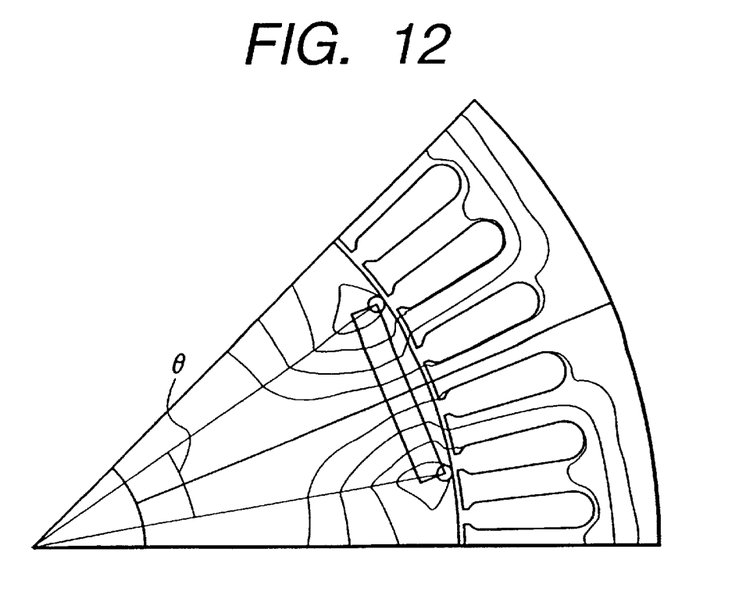
FIG. 12 is diagram showing a magnetic flux density distribution in a permanent magnet electric machine according to a third embodiment of the present invention.
Figure 13:
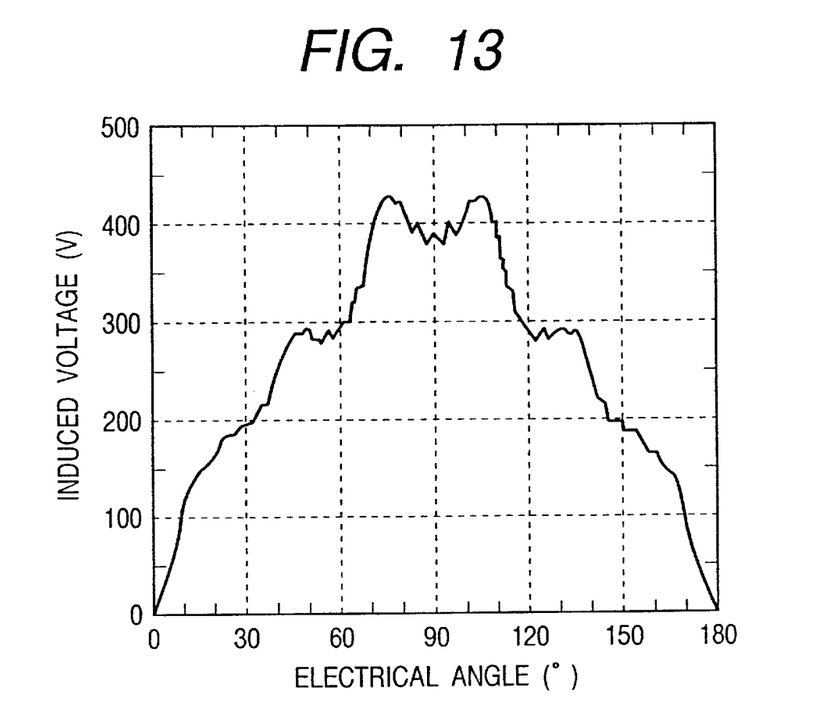
FIG. 13 is a waveform diagram showing the voltage induced in the permanent magnet electric machine of FIG. 12.

FIG. 12 shows the magnetic flux density distribution in a third embodiment of the permanent magnet electric machine according to the present invention, which has permanent magnets of a rectangular shape; and FIG. 13 shows the waveform of the voltage induced in that embodiment.

Figure 14:
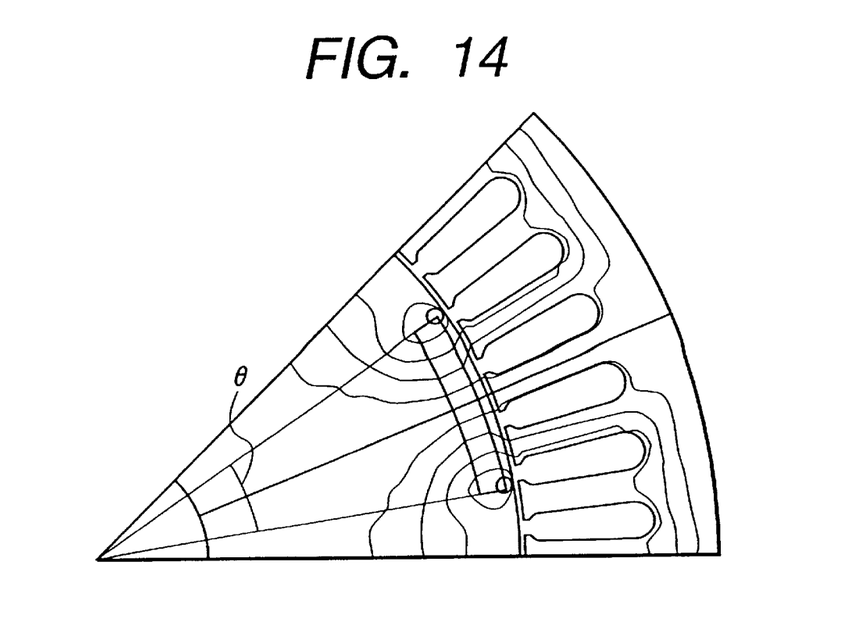
FIG. 14 is a diagram showing a magnetic flux density distribution in a permanent magnet electric machine according to a fourth embodiment of the present invention.
Figure 15:
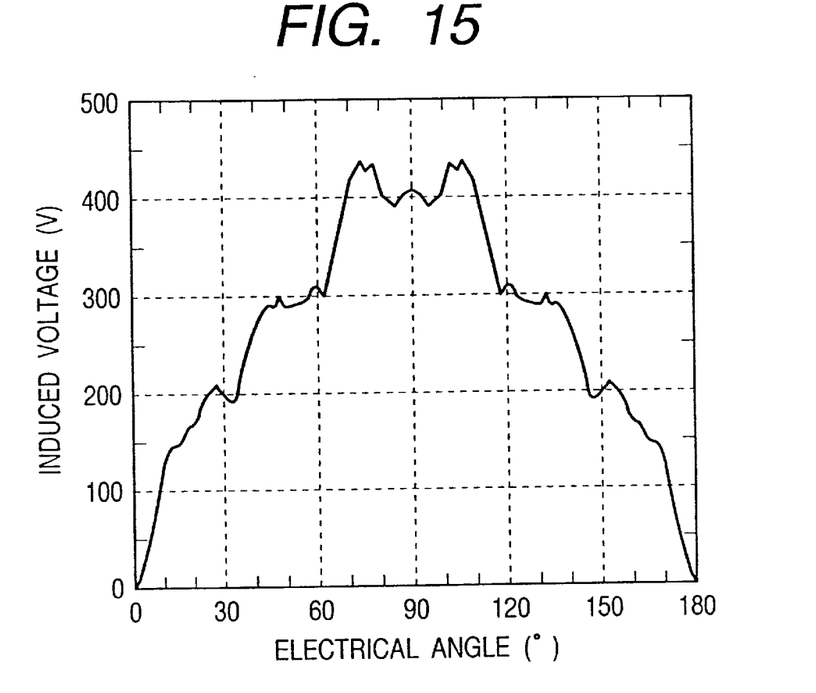
FIG. 15 is a waveform diagram showing the voltage induced in the permanent magnet electric machine of FIG. 14.

FIG. 14 shows the magnetic flux density distribution in a fourth embodiment of the permanent magnet electric machine according to the present invention, which has permanent magnets with a cross section of the shape of a fragment of a circular ring, and FIG. 15 shows the waveform of the voltage induced therein.

Figure 16:
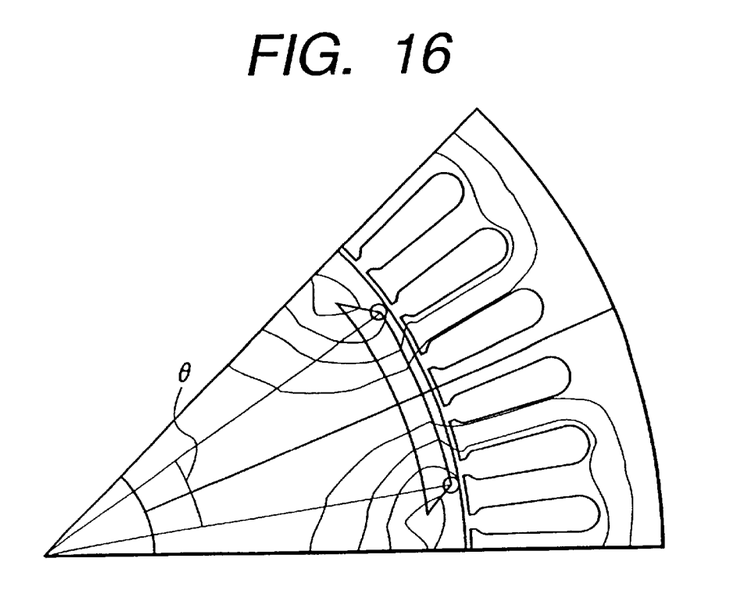
FIG. 16 is a diagram showing the magnetic flux density distribution in a permanent magnet electric machine according to a fifth embodiment of the present invention.
Figure 17:
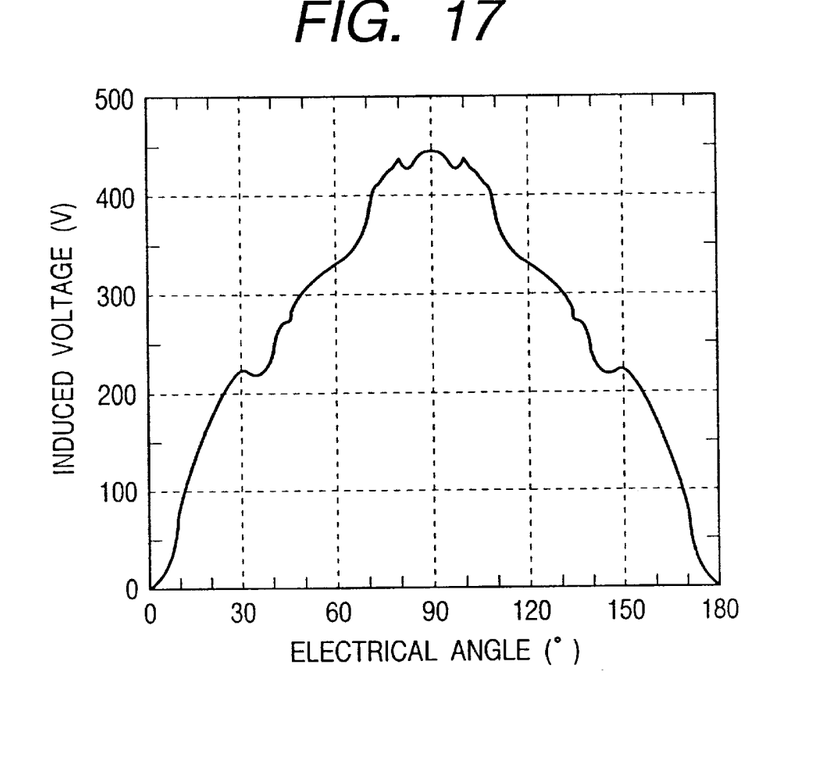
FIG. 17 is a waveform diagram showing the voltage induced in the permanent magnet electric machine of FIG. 16.

FIG. 16 shows the magnetic flux density distribution in a fifth embodiment of the permanent magnet electric machine according to the present invention, in which the permanent magnets have a substantially trapezoidal cross section, with curved upper and lower bases each in the shape of a circular arc, FIG. 17 shows the waveform of the voltage induced in the permanent magnet electric machine of FIG. 16.

Figure 18:
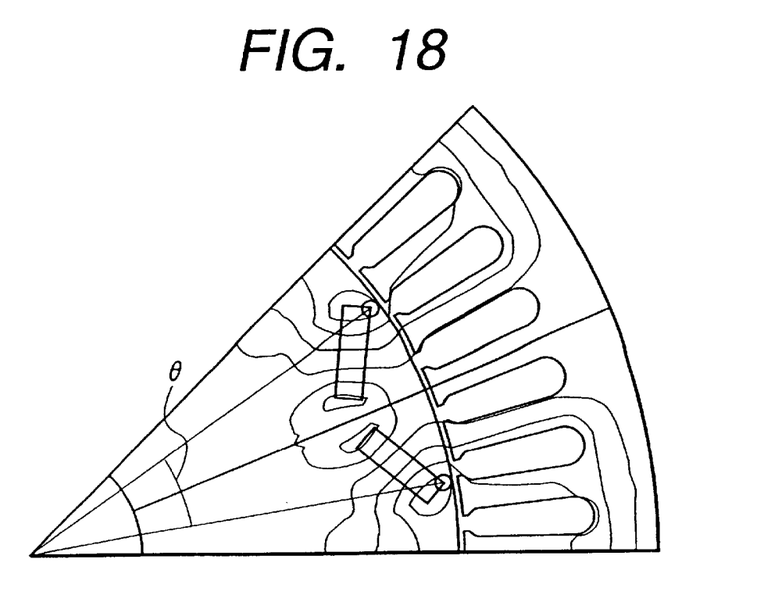
FIG. 18 is a diagram showing the magnetic flux density distribution in a permanent magnet electric machine according to a sixth embodiment of the present invention.
Figure 19:
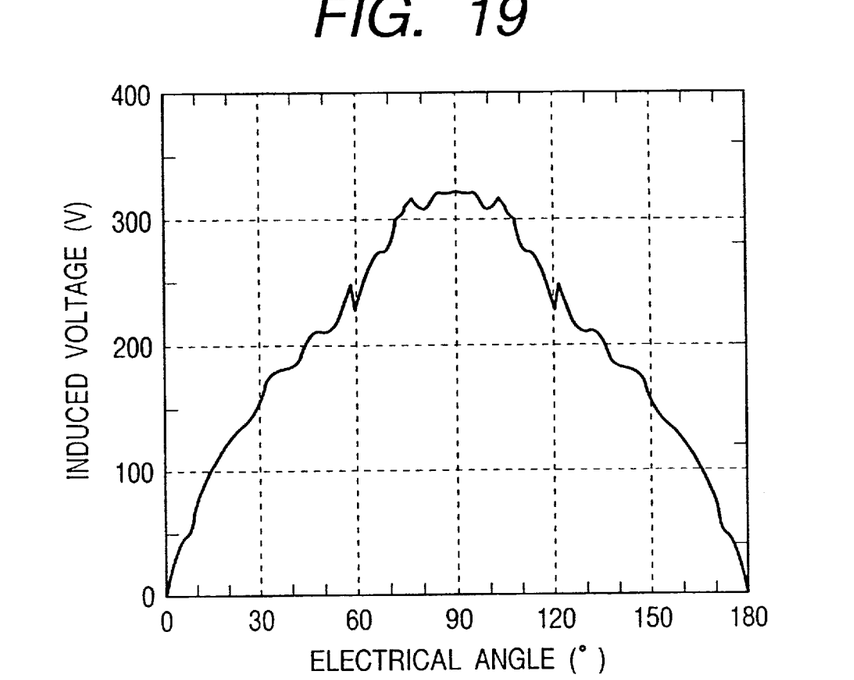
FIG. 19 is a waveform diagram showing the voltage induced in the permanent magnet electric machine of FIG. 18.

FIG. 18 shows the magnetic flux density distribution in a sixth embodiment of the permanent magnet electric machine according to the present invention, in which the permanent magnets have a V-shaped cross section, while FIG. 19 shows the waveform of the voltage induced therein.

Figure 20:
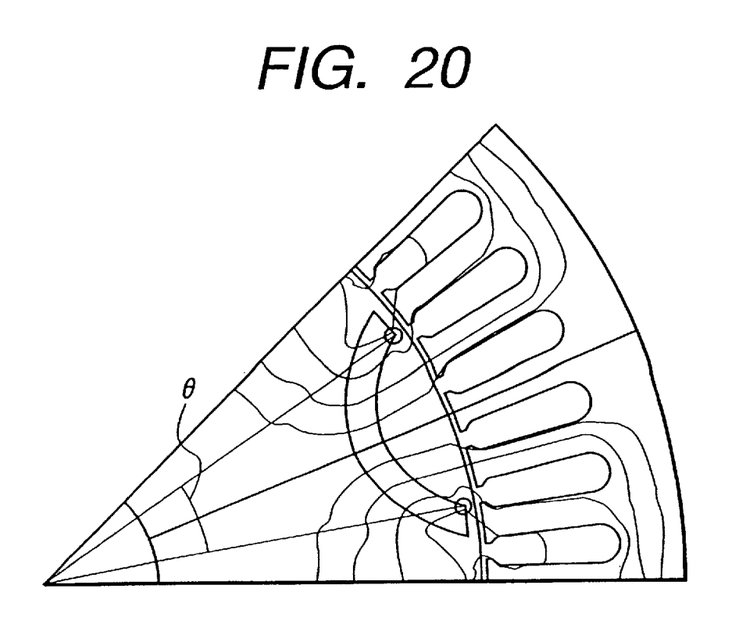
FIG. 20 is a diagram showing the magnetic flux density distribution in a permanent magnet electric machine according to a seventh embodiment of the present invention.
Figure 21:
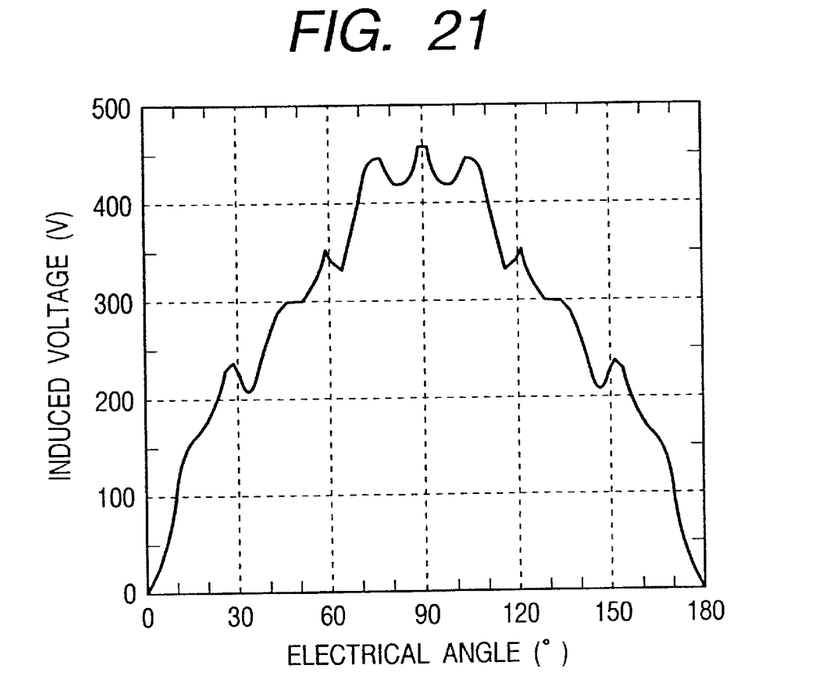
FIG. 21 is a waveform diagram showing the voltage induced in the permanent magnet electric machine of FIG. 20.

FIG. 20 shows magnetic flux density distribution in a seventh embodiment of the permanent magnet electric machine according to the present invention, which has permanent magnets with a U-shaped cross section; and FIG. 21 shows the waveform of the voltage induced in that embodiment.

As is apparent from FIGS. 12 to 20, the waveform of the induced voltage approximates a sinusoidal waveform when the angle θ is 26°, regardless of the shape of the permanent magnets.

If the permanent magnet is partially embedded in the rotor, magnetic flux densities in the permanent magnet portion and the iron portion increase. Therefore, the waveform of the induced voltage can approximate a sinusoidal waveform when $$\theta \approx n \times \tau_s + \gamma \text{ (n is a natural number)}$$

In this case, the angle θ is an angle whose sides are radii of the rotor passing through the opposite circumferential ends of a portion of the permanent magnet projecting from the circumference of the rotor core 7.

Figure 22:
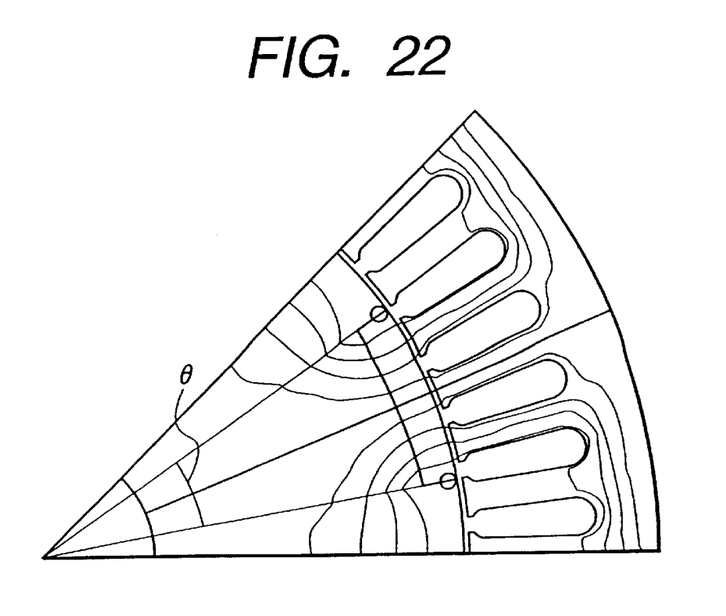
FIG. 22 is a diagram showing the magnetic flux density distribution in a permanent magnet electric machine according to an eighth embodiment of the present invention.
Figure 23:
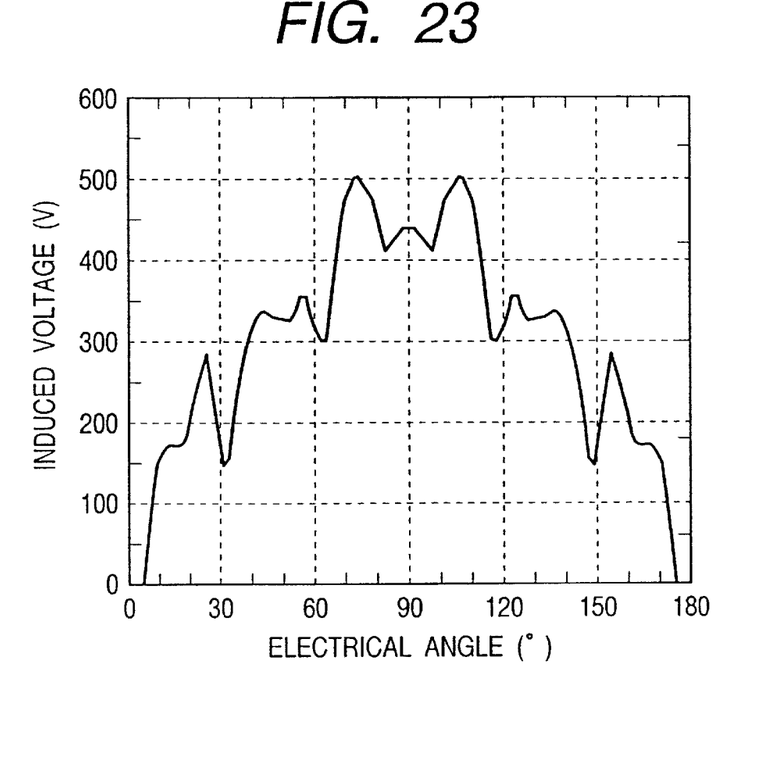
FIG. 23 is a waveform diagram showing the voltage induced in the permanent magnet electric machine of FIG. 22.

FIG. 22 shows the magnetic flux density distribution in an eighth embodiment of the permanent magnet electric machine according to the present invention, using permanent magnets that have a cross section with the shape of a fragment of a circular arc and partially embedded in the rotor core, and FIG. 23 shows the waveform of the voltage induced therein.

Figure 24:
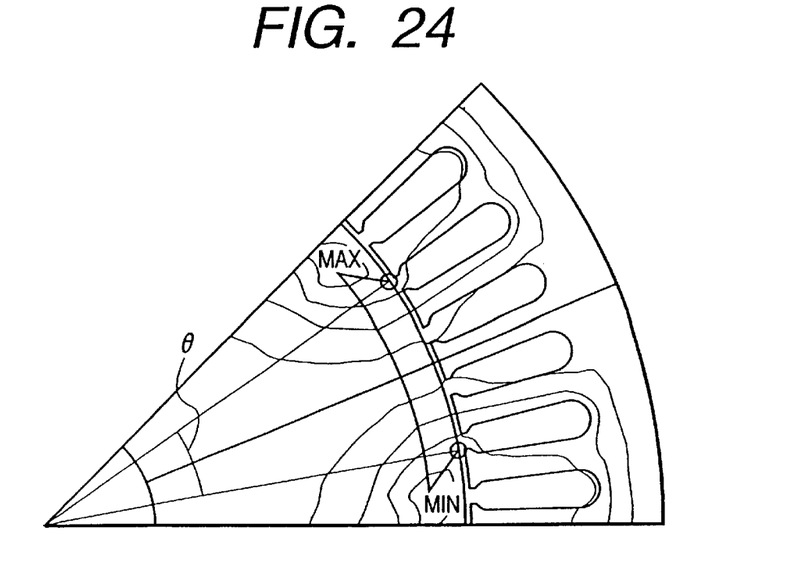
FIG. 24 is a diagram showing the magnetic flux density distribution in a permanent magnet electric machine according to a ninth embodiment of the present invention.

FIG. 24 is a diagram showing the magnetic flux density distribution in a ninth embodiment of the permanent magnet electric machine according to the present invention, in which the permanent magnets have a substantially trapezoidal cross section, with curved upper and lower bases which are a segment of a circular arc, and are partially embedded in the stator core.

Figure 25:
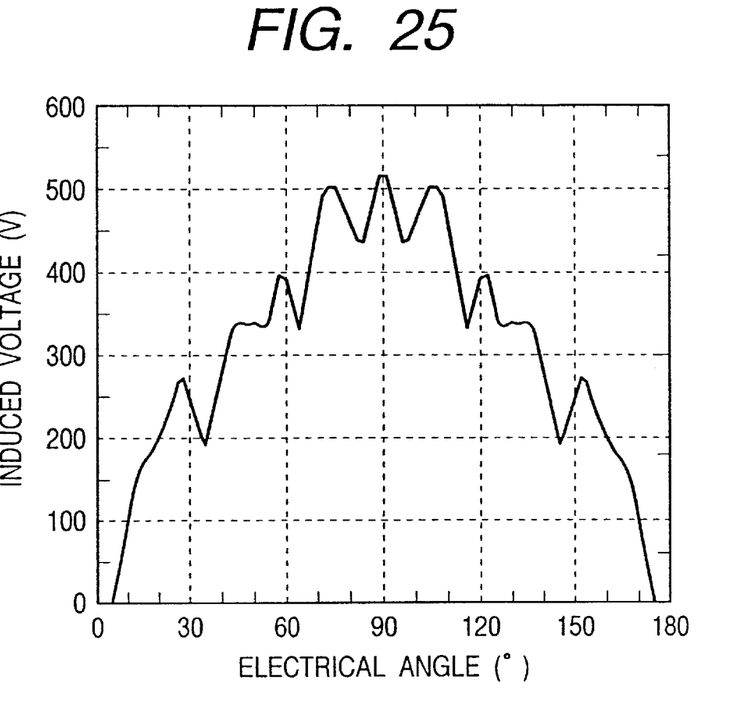
FIG. 25 is a waveform diagram showing the voltage induced in the permanent magnet electric machine of FIG. 24.

FIG. 25 shows the waveform of the voltage induced in the permanent magnet electric machine of FIG. 24.

Figure 26:
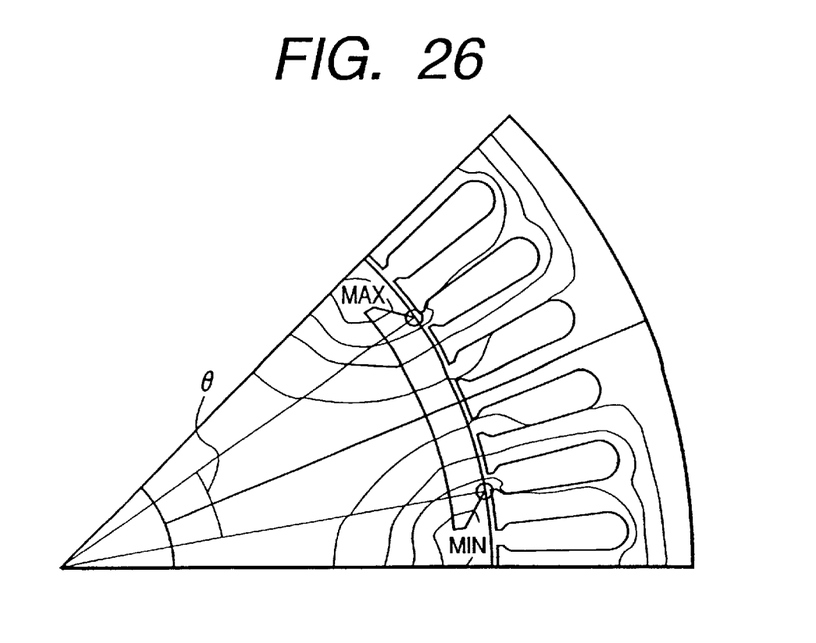
FIG. 26 is a diagram showing the magnetic flux density distribution in a permanent magnet electric machine according to a tenth embodiment of the present invention.
Figure 27:
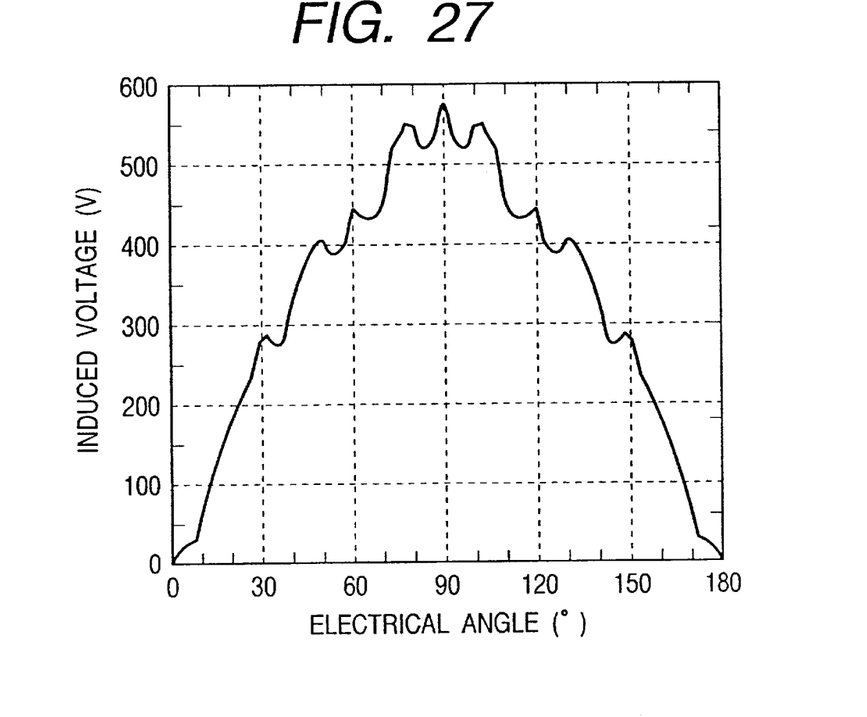
FIG. 27 is a waveform diagram showing the voltage induced in the permanent magnet electric machine of FIG. 26.

FIG. 26 shows the magnetic flux density distribution in a tenth embodiment of the permanent magnet electric machine according to the present invention, wherein the permanent magnets have a trapezoidal cross section and are partially embedded in the rotor core, and FIG. 27 shows the waveform of the voltage induced.

As is apparent from FIGS. 22 to 27, the waveform of the induced voltage can approximate a sinusoidal waveform when the angle θ is 24°, regardless of the shape of the permanent magnets.

Figure 28:
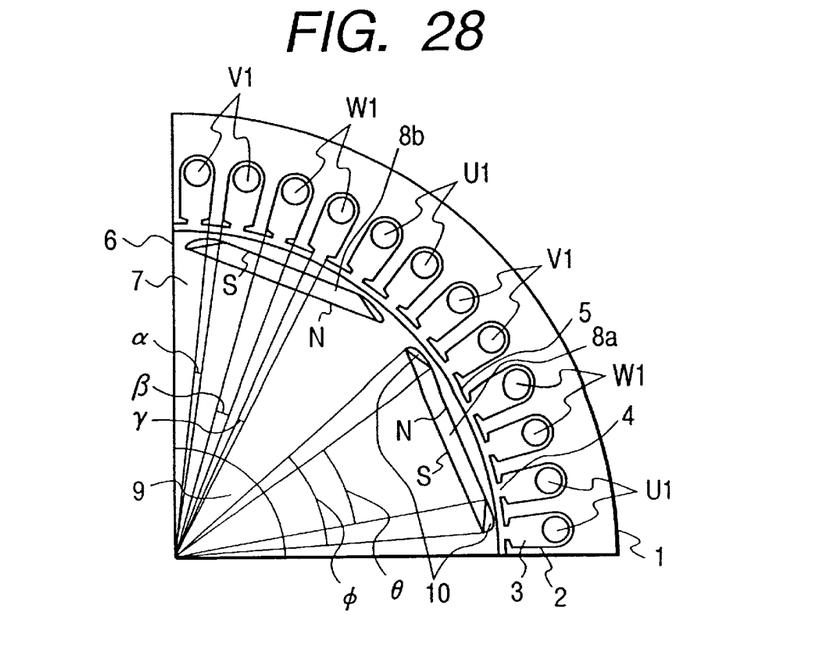
FIG. 28 is a cross-sectional view of a permanent magnet electric machine according to an eleventh embodiment of the present invention.

Formation of magnetic gaps 10 at the opposite ends of the magnets as shown in FIG. 28 is effective in reducing cogent torque and noise, suppressing the peak value of the induced voltage. The magnetic gaps may be vacant spaces or spaces filled up with a nonmagnetic substance held in the spaces with varnish or an adhesive.

The permanent magnet electric machine of the present invention can be used effectively as a driving motor for an electric vehicle. While an electric vehicle provided with the permanent magnet electric machine according to the invention as a driving motor is being braked or traveling a downhill slope, the permanent magnet electric machine operates as a generator, and an induced voltage is applied to the control circuit, which generally is designed to withstand the effective value of the induced voltage generated by the permanent magnet electric machine. Therefore, the waveform of the induced voltage approximates a sinusoidal waveform, so that the peak of the induced voltage may not exceed a value equal to $\sqrt{2}$ times the effective value, and the peak is suppressed to secure high safety for the electric vehicle.

In the permanent magnet electric machine of the present invention, the number of the permanent magnets 8 need not be limited to eight, and the number of the slots of the stator need not be limited to forty-eight. Also, as noted previously, the permanent magnet 8 need not necessarily be neodymium magnets, and the angles relating to the permanent magnets may vary within an angular range corresponding to a manufacturing tolerance. The improvement of the waveform is effective in linear motors and the like as well as in rotating machines with outer and inner rotors.

According to the present invention, the peak voltage is relatively small relative to the effective value because the waveform of the induced voltage approximates a sinusoidal waveform.

According to the present invention, the peak of the induced voltage can be held low and a high driving torque can be produced, because the circumferential length of the surfaces of the permanent magnets facing the stator is determined so that the waveform of the induced voltage approximates a sinusoidal waveform.

According to the present invention, the peak of the induced voltage generated by the permanent magnet electric machine while the electric vehicle is being braked or the electric vehicle is traveling a downhill slope is held low by making the waveform of the induced voltage approximate a sinusoidal waveform, so that improved safety can be secured for the electric vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A permanent magnet electric machine comprising:

a stator provided with windings thereon; and a rotor disposed with an air gap between the stator and the rotor, and having a plurality of permanent magnets fixed along a circumference thereof, with spacing between adjacent magnets; wherein a circumferential extent of surfaces of the permanent magnets facing the stator is selected so that an induced voltage in the machine has a waveform which approximates a sinusoidal waveform; and an angle $\theta$, whose sides are radii of the rotor passing through opposite circumferential ends of a surface of each permanent magnet which is nearer to the stators, is smaller than an angle $\psi$, whose sides are radii of the rotor passing through opposite circumferential ends of a surface of each permanent magnet which is farther from the stator.

2. The permanent magnet dynamoelectric rotating machine according to claim 1, wherein the permanent magnets have a trapezoidal cross section.

* * * * *